United States Patent Office 3,004,035
Patented Oct. 10, 1961

3,004,035
DIALKYLPHENOL CONDENSATION PRODUCTS
Ernest Csendes, Wilmington, Del., assignor to E. I. du Pont de Nemours and Company, Wilmington, Del., a corporation of Delaware
No Drawing. Filed Aug. 31, 1959, Ser. No. 836,896
3 Claims. (Cl. 260—309.7)

This invention is directed to new compounds which are condensation products of (1) 2,6-dialkylphenols, in which at least one alpha carbon atom ortho to the hydroxy group is branched, with (2) N,N'-dimethylolethyleneurea [1,3-bis(hydroxymethyl)-2-imidazolidone] or a methylolurea such as monomethylolurea, dimethylolurea, trimethylolurea, and tetramethylolurea.

Although a variety of compounds, such as the diarylamines, are effective antioxidants in natural rubber and other elastomers, they have the disadvantage of discoloring light-colored elastomer compositions when exposed to sunlight or heat aging. Simple phenols, such as parahydroxybiphenyl, have been used. More recently dihydric phenols have been used, such as 2,2'-ethylidenebis(4,6-dimethylphenol) and 2,2'-methylenebis(6-tert-butyl-p-cresol). The effectiveness of phenolic compounds of this type varies greatly and is unpredictable. There is a need in the industry for additional compounds which are effective non-discoloring antioxidants.

It is, therefore, an object of this invention to provide new chemical compounds which are non-discoloring when exposed to heat or light. It is an object of this invention to provide novel condensation products which are outstanding in their ability to protect natural rubber and synthetic elastomers against deterioration by heat. These and other objects will become apparent in the following description and claims.

More specifically, the present invention relates to compounds having the structure taken from the group consisting of (a)
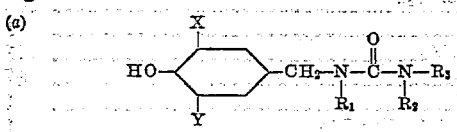

and (b)
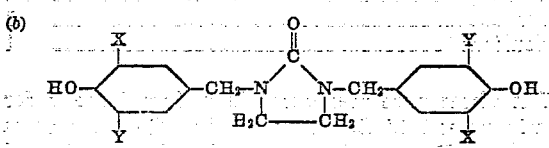

in which compounds X is an alkyl radical containing from 3 to 8 carbon atoms and is branched on the alpha carbon atom, Y is an alkyl radical containing from 1 to 8 carbon atoms, and $R_1$, $R_2$, and $R_3$ of Formula a may be hydrogen or

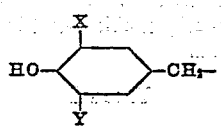

X and Y being as heretofore defined.

The preferred compounds of this invention are those prepared from compounds in which at least one alpha carbon ortho to the hydroxy group of the phenol is a tertiary carbon atom. The most preferred compounds are those prepared from 6-tert-butyl-o-cresol.

The compounds of the present invention may be prepared by reacting a solution of the 2,6-dialkylphenol in an inert solvent such as benzene with an aqueous solution of the methylolurea or dimethylolethyleneurea in the presence of an acid catalyst such as hydrochloric acid and a dispersing agent to ensure emulsification of the benzene solution in the aqueous medium.

The methylolureas may be prepared by reacting urea and formaldehyde in molar proportions of one to four or more moles of formaldehyde to one mole of urea under mildly alkaline conditions (pH 7–9) as described in J. F. Walker, "Formaldehyde," 2d. ed., Reinhold Publishing Corp., 1953, pages 294–295.

The dimethylolethyleneurea may be prepared as described in Example 1 of U.S. Patent 2,373,136.

Methods of preparing the dialkylphenols are known; for example, alkylation of various phenols with olefins in the presence of the aluminum phenolate is described in Angewandte Chemi 69, 699–706 (1957). The preparation of 2-isopropyl-6-tert-butyl-phenol is described in U.S. 2,836,609.

The compounds of this invention may be used in a number of different ways to protect elastomeric materials. The antioxidant may be added to the dry polymer in known ways, such as by blending on a roll mill or in a Banbury mixer, or an aqueous dispersion of the antioxidant may be added to the polymer latex.

Amounts of the present novel antioxidants which are effective range from 0.1–5.0 parts per hundred parts of elastomer, depending on the degree of protection desired, the type of polymer, and the conditions of use. In general, less than 0.1 part, per hundred parts of elastomer, of the novel antioxidants of this invention will give inadequate protection and more than 5.0 parts will not be required from a practical viewpoint.

The novel products of this invention may be used to stabilize elastomers, including the following representative elastomers:

(1) Natural rubber
(2) 1,3-butadiene and isoprene polymers, including copolymers with acrylonitrile or styrene and cis-polyisoprene
(3) 2-chloro-1,3-butadiene polymers and copolymers
(4) Polymers of isobutylene and copolymers thereof with minor amounts of diolefins
(5) Polymers of halogenated olefins, such as copolymers of vinylidene fluoride with hexafluoropropene or chlorotrifluoroethylene
(6) Chlorosulfonated polyethylene
(7) Elastomeric polymers of propylene and copolymers of ethylene and propylene or other alpha olefins The phenolic antioxidants of this invention may be used with synergists such as sorbitol, N-alkylglucamine, and 1-thiosorbital to achieve even more significant effects.

The compounds of this invention are also of value in inhibiting gel formation during the processing of SBR (a copolymer of butadiene and styrene) and for stabilization of melts of polypropylene at temperatures as high as 275° C.

Representative examples illustrating the present invention follow.

EXAMPLE 1

*Reaction product of 6-tert-butyl-o-cresol with dimethylolethyleneurea*

164 g. of 6-tert-butyl-o-cresol and 250 ml. benzene were dispersed in 140 ml. of concentrated hydrochloric acid in the presence of 35 ml. of a 25% aqueous solution of C-cetyl betaine (available commercially as Product BCO), and heated to 65° C. To this emulsion was added with agitation, over a period of one hour, 91.25 g. of N,N'-dimethylolethyleneurea [1,3-bis(hydroxymethyl)-2-imidazolidone] dissolved in 274 ml. of water. The reaction mass was agitated at 65–70° C. for 4½ hours. The acidic water layer was separated and replaced with fresh water. Agitation was started, and the emulsion was neutralized with dilute sodium hydroxide. The benzene and unreacted phenolic starting material were removed by steam distillation. The condensation product, which solidified to a hard, yellowish mass, was filtered, washed with water, and dried. The resulting product, 1,3 - bis(3 - tert - butyl - 4 - hydroxy - 5 - methylbenzyl)-2-imidazolidone, melted at 92° C. after softening at 84° C.

EXAMPLE 2

Reaction product of 6-tert-butyl-o-cresol with dimethylolurea 486 ml. of 37% formaldehyde was made alkaline to brilliant yellow paper by addition of 4 N sodium hydroxide. To this was added 4.0 g. of disodium phosphate, and the solution was cooled to 20° C. To this solution was added, in portions, 180 g. of urear over a 5-minute period. Agitation was continued at 20° C. until a clear solution was obtained. The resultant reaction mass solidified overnight, and the crystalline mass was broken up by adding ethyl alcohol. After filtering, the filter cake was reslurried in ethyl alcohol and refiltered. The filter cake was washed twice with ether and dried in a vacuum at room temperature. The yield was 283 g. of dimethylolurea.

158 g. of dimethylolurea was dissolved in 900 ml. of water and filtered from the insoluble polymeric material. An emulsion was prepared from 246 g. of 6-tert-butyl-o-cresol, 250 ml. of benzene, 70 ml. of a 25% aqueous solution of C-cetyl betaine, and 200 ml. of 37% hydrochloric acid. To this emulsion was added the dimethylolurea solution at 65° C. over a period of 1 hour, and agitation was continued at 65-70° C. for an additional 4½ hours. The procedure for isolation followed that of Example 1. The melting point of the product was 95° C. after softening at 91° C.

Analysis for nitrogen was 6.4%. The theoretical calculation for $C_{25}H_{36}N_2O_3$ is 6.96%. The structure for the final product corresponds to

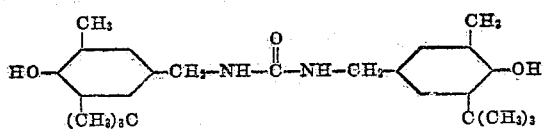

The freshly prepared dimethylolurea may be condensed in aqueous solution, without isolation, with 6-tert-butyl-o-cresol.

EXAMPLE 3

Reaction product of 6-tert-butyl-o-cresol with monomethylolurea

Urea (70 g.) was dissolved in 150 ml. of water and to this solution was added dropwise over a 15-minute period at 5-10° C. 86 ml. of 37% formaldehyde, which had been made alkaline to pH 9 and to which had been added 8 g. of disodium phosphate. The mixture was agitated overnight at 5;10° C. The clear solution was added to an emulsion prepared from 164 g. of 6-tert-butyl-o-cresol, 200 ml. of benzene, 56 ml. of a 25% aqueous solution of C-cetyl betaine, and 320 ml. of concentrated hydrochloric acid. The mixture was refluxed for 5 hours, and the product was isolated as in Example 1. The yield was 208 g. of a product having a melting point 98-100° C.

EXAMPLE 4

Reaction product of 6-tert-butyl-o-cresol with tetramethylolurea 340 ml. of a 37% solution of formaldehyde, made alkaline to pH 9 with sodium hydroxide and containing 5 g.of disodium phosphate, was added dropwise to a solution of 35 g. of urea in 75 ml. of water at 5-10° C. Agitation was continued overnight at 10-20° C. This solution was added to an emulsion prepared from 164 g. of 6-tert-butyl-o-cresol, 200 ml. of benzene, 56 ml. of a 25% aqueous solution of C-cetyl betaine, and 350 ml. of concentrated hydrochloric acid. The reaction wass was refluxed for 5 hours under agitation. Isolation was carried out as in Example 1. The product was dried in a vacuum oven at 50° C. The yield was 206 g. of product having a melting point of 80-82° C.

EXAMPLE 5

In any of the Examples 1-4 above, one may use, instead of the 6-tert-butyl-o-cresol, any 2,6-dialkylphenol in which one alkyl radical contains 3 to 8 carbon atoms and is branched on the alpha carbon atom and the other alkyl group may be branched or straight-chain and contains 1to 8 carbon atoms and achieve similar results reflected in these representative examples in which the compounds obtained differ only in the alkyl groups ortho to the phenolic hydroxyl radicals.

Examples of phenols which may be substituted in Examples 1-4 to give substantially the same results are 2,6-di-tert-butylphenol, 2-tert-butyl-6-ethylphenol, 2-tert-butyl-6-isopropylphenol, 2-tert-butyl-6-n-propylphenol, 2,6-diisopropylphenol, 2-tert-butyl-6-(1,1,3,3-tetramethylbutyl)phenol, 2-methyl-6-(1,1,3,3-tetramethylbutyl)phenol, 2,6-bis(1,1,3,3-tetramethylbutyl)phenol, 2-tert-amyl-6-methylphenol, 2-tert-amyl-6-ethylphenol, 2,6-di-tert-amylphenol, 2-methyl-6-(1-methylbutyl)phenol, 2-methyl-6-sec-butylphenol, 2,6-di-sec-butylphenol, and the like.

EXAMPLE 6

The compounds of Examples 1-4 were tested as nondiscloring antioxidants for natural rubber in the following white stock:

| | Parts by weight |
|---|---|
| Pale crepe rubber | 100 |
| Zinc oxide | 5 |
| Titanium oxide | 13 |
| Whiting | 67 |
| Stearic acid | 1 |
| 2-benzothiazolyl disulfide | 1 |
| Tetramethylthiuram monosulfide | 0.1 |
| Sulfur | 2 |
| Antioxidant | 1 |

Test pieces were press-cured in preheated molds for 30 minutes at 142° C. The original tensile strength was measured. The samples were subjected to accelerated aging at 121° C. for 24 hours according to ASTM testing method D865–54T. Test results are shown as the percent of the original tensile strength retained after aging. Measurements of tensile strength were made according to ASTM test D412–51T. A commercially available antioxidant, 2,2'-methylenebis(6-tert-butyl-p-cresol), was used for comparison.

TABLE I

| Antioxidant: | Percent retention of tensile strength |
|---|---|
| 2,2'-methylenebis(6-tert-butyl-p-cresol) | 46 |
| Condensation product of 6-tert-butyl-o-cresol with: | |
| Dimethylolethyleneurea (product of Example 1) | 40 |
| Monomethylolurea (product of Example 3) | 50 |
| Dimethylolurea (product of Example 2) | 46 |
| Tetramethylolurea (product of Example 4) | 50 |

EXAMPLE 7

A black stock was prepared from the following ingredients:

| | Parts by weight |
|---|---|
| Smoked sheets | 100.0 |
| Easy processing carbon black | 45.0 |
| Stearic acid | 3.0 |
| Zinc oxide | 5.0 |
| Sulfur | 2.8 |
| 2-mercaptobenzothiazole | 1.0 |
| Antioxidant | 1.0 |

Test pieces were press-cured in preheated molds for 45 minutes at 144° C. The samples were subjected to accelerated aging at 121° C. for 24 hours as described in ASTM D865–54T. Test results are shown in Table II as percent of the original tensile strength retained after aging.

For comparison, N-phenyl-beta-naphthylamine and 2,2'-methylenebis(6-tert-butyl-p-cresol) were tested.

TABLE II

| Antioxidant: | Percent retention of tensile strength |
|---|---|
| N-phenyl-beta-naphthylamine | 22 |
| 2,2'-methylenebis(6-tert-butyl-p-cresol) | 23 |
| Condensate of 6-tert-butyl-o-cresol with dimethylolurea (product of Example 2) | 25 |

EXAMPLE 8

A white stock was prepared from a butadiene-styrene copolymer using the following recipe:

| | Parts |
|---|---|
| Butadiene-styrene copolymer (SBR–1500) | 100.0 |
| Stearic acid | 1.5 |
| Zinc oxide | 5.0 |
| Clay | 100.0 |
| Titanium oxide | 10.0 |
| 2-benzothiazolyl disulfide | 1.5 |
| Tetramethylthiuram monosulfide | 0.2 |
| Sulfur | 2.0 |
| Condensate of 6-tert-butyl-o-cresol with dimethylolurea (product of Example 2) | 1.0 |

Test pieces were press-cured in preheated molds at 152° C. for 20 minutes. The samples were submitted to accelerated aging at 121° C., as described in ASTM test D865–54T, for the periods shown in Table III. A control was run to which no antioxidant was added. Test results are shown by comparing percent elongation at the breaking point as determined by ASTM test D412–51T. The data are shown in Table III.

TABLE III

| | Elongation at Break (Percent) | |
|---|---|---|
| Period of Aging (Days) | No Antioxidant | Condensate of 6-tert-butyl-o-cresol with dimethylolurea |
| 0 | 970 | 980 |
| 1 | 140 | 250 |
| 3 | 40 | 120 |
| 5 | 20 | 60 |

EXAMPLE 9

A white stock was prepared using the following recipe:

| | Parts |
|---|---|
| Pale crepe rubber | 100 |
| Zinc oxide | 5 |
| Stearic acid | 1 |
| Titanium oxide | 13 |
| Precipitated calcium carbonate | 47 |
| 2-benzothiazolyl disulfide | 1 |
| Tetramethylthiuram monosulfide | 0.1 |
| Sulfur | 2 |
| Antioxidant | 1 |

Test pieces were cured for 30 minutes at 142° C. The cured pieces were tested as described in ASTM method D1148–55 using a RS sunlight bulb. For comparison, 2,2'-methylenebis(6-tert-butyl-p-cresol) was also tested. Table IV shows the results.

TABLE IV

| Antioxidant | Exposure, Hours | | |
|---|---|---|---|
| | 0 | 32 | 64 |
| None | 0 | 3+ | 5 |
| Condensate of 6-tert-butyl-o-cresol with dimethylolurea (Product of Example 2) | –0 | 3–4 | 5 |
| 2,2'-Methylenebis(6-tert-butyl-p-cresol) | 0 | 5 | 7 |

0=white (creamy).
3+=slightly less discolored than 3–4.
10=dark brown discoloration.

EXAMPLE 10

A terpolymer of ethylene, propylene, and 11-ethyl-1,11-tridecadiene was prepared as follows:

Propylene at the rate of 2.2 liters per minute and ethylene at 1 liter per minute were passed into 2 liters of tetrachloroethylene to which had been added 3.4 grams of 11-ethyl-1,11-tridecadiene. After fifteen minutes 0.78 gram of triisobutylaluminum and 0.35 gram of vanadyl trichloride were added. A solution of 7.0 grams of 11-ethyl-1,11-tridecadiene in 40 ml. of tetrachloroethylene was added to the reaction system over a period of 18 minutes. The polymerization was continued for 26 minutes more with the gases introduced at the stated rates, and the product was then isolated by precipitation with isopropanol. The polymer was dried on a rubber mill and 0.7 gram of 2,2'-methylene-bis-(6-tert-butyl-p-cresol) was added as antioxidant. There was obtained 67.5 grams of elastomeric material.

Four identical runs were combined to yield a polymer having an iodine number of 8.4 and an intrinsic viscosity (tetrachloroethylene at 30° C.) of 3.10.

Black stocks were prepared from this terpolymer using the following recipes:

| | Parts | |
|---|---|---|
| | A | B |
| Terpolymer | 100 | 100 |
| High-abrasion furnace carbon black | 50 | 50 |
| Zinc oxide | 5 | 5 |
| Stearic acid | 1 | 1 |
| 2-Benzothiazolyl disulfide | 1.5 | 1.5 |
| Tetramethylthiuram disulfide | 3 | 3 |
| Sulfur | 0.7 | 0.7 |
| Condensate of 6-tert-butyl-o-cresol with dimethylolurea (Product of Example 2) | | 2 |

Test pieces were cured 60 minutes at 150° C. Samples were aged at 150° C. for 14 days and for 21 days in a circulating air oven. Tensile properties of the cured samples were determined at 25° C. before and after aging on the Williams tensile machine [see Williams and Sturgis, Ind. Eng. Chem. 31, 1303 (1939)]. Table V, which follows, shows the test results.

TABLE V

|  | Original | | Aged 14 Days | | Aged 21 Days | |
| --- | --- | --- | --- | --- | --- | --- |
|  | A | B | A | B | A | B |
| Modulus at 100% elongation, p.s.i. | 300 | 280 | 930 | 1,020 | ------ | 1,030 |
| Tensile strength at break in p.s.i. | 2,350 | 2,150 | 1,250 | 2,000 | 580 | 1,650 |
| Elongation at break, percent | 400 | 420 | 120 | 150 | 50 | 140 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound taken from the group consisting of those compounds having the structure (a) 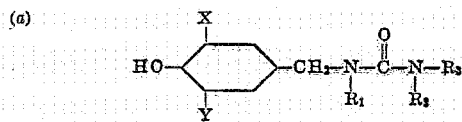

and (b) 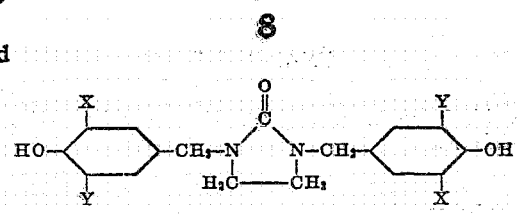

in which compounds, $R_1$, $R_2$ and $R_3$ of (a) is taken from the group consisting of hydrogen and

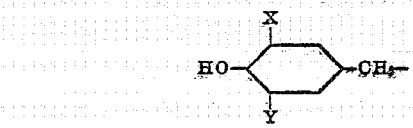

X is lower tertiary alkyl and Y is lower alkyl.

2. The compound 1,3-bis(3-tert-butyl-4-hydroxy-5-methylbenzyl)urea.

3. The compound 1,3-bis(3-tert-butyl-4-hydroxy-5-methylbenzyl)-2-imidazolidone.

References Cited in the file of this patent
FOREIGN PATENTS 773,874    Great Britain _____ May 1, 1957

OTHER REFERENCES

Zigeuner et al.: Chem. Abstracts, vol. 47, col. 2131 (1953).

Takano et al.: Chem. Abstracts, vol. 47, col. 3258 (1953).